US012244446B2

(12) United States Patent
Lopez et al.

(10) Patent No.: US 12,244,446 B2
(45) Date of Patent: Mar. 4, 2025

(54) TRANSFORM FOR COMMUNICATION SYMBOLS

(71) Applicant: Telefonaktiebolaget LM Ericsson (publ), Stockholm (SE)

(72) Inventors: Miguel Lopez, Aachen (DE); Leif Wilhelmsson, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 1 day.

(21) Appl. No.: 18/266,596

(22) PCT Filed: Dec. 14, 2020

(86) PCT No.: PCT/EP2020/086035
§ 371 (c)(1),
(2) Date: Jun. 12, 2023

(87) PCT Pub. No.: WO2022/128062
PCT Pub. Date: Jun. 23, 2022

(65) Prior Publication Data
US 2024/0048424 A1    Feb. 8, 2024

(51) Int. Cl.
*H04L 27/26* (2006.01)
(52) U.S. Cl.
CPC ...... *H04L 27/2639* (2013.01); *H04L 27/2602* (2013.01)
(58) Field of Classification Search
CPC ............. H04L 27/2639; H04L 27/2602; H04L 27/03891; H04L 27/03898; H04L 27/0391;
(Continued)

(56) References Cited

U.S. PATENT DOCUMENTS 7,450,591 B2 *  11/2008  Korling ................. H04M 15/43
                                                        370/395.43
7,822,155 B2 *  10/2010  Lindoff ................. H04B 1/7103
                                                        375/138
(Continued)

OTHER PUBLICATIONS

PCT International Search Report, mailed Sep. 6, 2021, in connection with International Application No. PCT/EP2020/086035, all pages.
(Continued)

*Primary Examiner* — James M Perez
(74) *Attorney, Agent, or Firm* — Leffler Intellectual Property Law, PLLC (57) ABSTRACT

A method is disclosed for transferring data symbols between a transmitter and a receiver. The method comprises specifying communication symbols through application of a transform to a representation of the data symbols, and conveying a signal indicative of the communication symbols from the transmitter to the receiver. When expressed as a transform matrix, the transform has at least the following properties: that a ratio (between number of zero-valued elements of the transform matrix and number of non-zero-valued elements of the transform matrix) equals or exceeds a sparsity threshold, and that a number of columns of the transform matrix that has a zero-valued element sum equals or exceeds an angle distortion mitigation threshold. When the method is performed by the transmitter, the method may further comprise providing the communication symbols by applying the transform to amplitude representations of the data symbols, and conveying the signal indicative of the communication symbols may comprise transmitting the signal. When the method is performed by the receiver, conveying the signal indicative of the communication symbols may comprise receiving the signal, and the method may further comprise estimating the data symbols by applying a
(Continued)

reverse operation of the transform to angle representations of the received signal. Corresponding apparatuses, transmitter, receiver, communication device and computer program product are also disclosed.

32 Claims, 3 Drawing Sheets (58) Field of Classification Search
CPC ........ H04L 27/03917; H04L 27/03923; H04B 7/04; H04B 7/0413; H04B 7/0456; H04B 7/0486

See application file for complete search history.

(56) References Cited

U.S. PATENT DOCUMENTS

| | | | | |
|---|---|---|---|---|
| 7,920,637 | B2* | 4/2011 | Fonseka | H04L 1/0054 375/265 |
| 8,451,932 | B2* | 5/2013 | Onggosanusi | H04B 7/0426 375/267 |
| 8,451,944 | B2* | 5/2013 | Gaur | H04B 7/0426 375/350 |
| 9,281,881 | B2* | 3/2016 | Onggosanusi | H04B 7/0417 |
| 9,380,603 | B2* | 6/2016 | Fantaye | H04W 52/0216 |
| 9,729,378 | B1* | 8/2017 | Ahmed | H04L 27/2273 |
| 10,064,207 | B2* | 8/2018 | Fantaye | H04W 72/54 |
| 10,181,965 | B2* | 1/2019 | Son | H04L 25/0204 |
| 10,250,360 | B2* | 4/2019 | Mejri | H04W 4/70 |
| 10,382,101 | B2* | 8/2019 | Al-Abbasi | H04L 25/03987 |
| 10,448,416 | B2* | 10/2019 | Fantaye | H04W 52/0219 |
| 10,567,993 | B2* | 2/2020 | Bergström | H04W 72/12 |
| 10,742,258 | B1* | 8/2020 | Brown | G01S 19/243 |
| 10,796,705 | B2* | 10/2020 | Grancharov | G10L 19/20 |
| 10,826,591 | B1* | 11/2020 | Akoum | H04B 7/0621 |
| 10,904,900 | B2* | 1/2021 | Fantaye | H04W 72/54 |
| 11,122,571 | B2* | 9/2021 | Vieira | H04B 7/088 |
| 11,606,233 | B2* | 3/2023 | Shattil | H04L 27/2614 |
| 11,838,904 | B2* | 12/2023 | Vieira | H04B 7/0408 |
| RE50,107 | E* | 8/2024 | Bergström | H04W 72/21 |
| 2005/0094816 | A1* | 5/2005 | Lindoff | H04B 1/7103 380/268 |
| 2007/0274411 | A1* | 11/2007 | Lee | H04B 7/0619 375/267 |
| 2008/0240274 | A1* | 10/2008 | Han | H04B 7/0639 375/260 |
| 2010/0039928 | A1* | 2/2010 | Noh | H04L 27/2615 370/210 |
| 2010/0208838 | A1* | 8/2010 | Lee | H04B 7/0469 375/267 |
| 2010/0215110 | A1* | 8/2010 | Onggosanusi | H04B 7/0426 375/295 |
| 2010/0284484 | A1* | 11/2010 | Jongren | H04B 7/10 375/267 |
| 2011/0058621 | A1* | 3/2011 | Clerckx | H04B 7/10 375/267 |
| 2011/0090985 | A1* | 4/2011 | Zhou | H04W 72/23 375/295 |
| 2011/0243079 | A1* | 10/2011 | Chen | H04B 7/0639 370/329 |
| 2011/0249712 | A1* | 10/2011 | Hammarwall | H04B 7/0634 375/220 |
| 2012/0170516 | A1* | 7/2012 | Noh | H04B 7/0456 370/328 |
| 2013/0129018 | A1* | 5/2013 | Ko | H04L 5/001 375/296 |
| 2013/0156125 | A1* | 6/2013 | Ko | H04L 25/03343 375/267 |
| 2014/0295865 | A1* | 10/2014 | Fantaye | H04W 52/0219 455/450 |
| 2017/0163296 | A1* | 6/2017 | Terry | H04B 1/69 |
| 2017/0257230 | A1* | 9/2017 | Son | H04B 7/0408 |
| 2018/0131548 | A1* | 5/2018 | Al-Abbasi | H04B 7/0413 |
| 2018/0175971 | A1* | 6/2018 | Mejri | H04L 1/0643 |
| 2020/0045717 | A1* | 2/2020 | Fantaye | H04W 72/54 |
| 2020/0374024 | A1* | 11/2020 | Lopez | H04B 1/70735 |
| 2024/0048424 | A1* | 2/2024 | Lopez | H04L 27/2639 |
| 2024/0088953 | A1* | 3/2024 | He | H04B 7/06952 |

OTHER PUBLICATIONS

PCT Written Opinion, mailed Sep. 6, 2021, in connection with International Application No. PCT/EP2020/086035, all pages.

Thompson, S.C. et al., "Constant Envelope OFDM", IEEE Transactions on Communications, vol. 56, No. 8, Aug. 2008, pp. 1300-1312.

Balal, Y. et al., :Constant Envelope Phase Modulation Inspired by Orthogonal Waveforms, IEEE Communications Letters, vol. 20, No. 11, Nov. 2016, pp. 2169-2172.

Nayyef, S. et al., "Low Complexity Precoded OFDM System", IEEE ICC 2013—Wireless Communications Symposium, pp. 5032-5036.

Sedghi, R. et al., "Sparsity-based MIMO interference suppression technique in the presence of imperfect channel state information", IET Communications, 2019, vol. 13, Iss. 19, pp. 3201-3206.

* cited by examiner

TRANSFORM FOR COMMUNICATION SYMBOLS

TECHNICAL FIELD

The present disclosure relates generally to the field of wireless communication. More particularly, it relates to transformation between data symbols and communication symbols for wireless communication.

BACKGROUND

Designing signaling and corresponding devices for wireless communication often entails one or more problem considerations. Some example considerations include data rate, error rate, robustness, power consumption, and complexity. Various existing approaches to wireless communication are inferior in one or more of these (or other) considerations.

Therefore, there is a need for alternative approaches to wireless communication. Preferably, such approaches provide improvement over known approaches in one or more of the above considerations.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for transferring data symbols between a transmitter and a receiver. The method comprises specifying communication symbols through application of a transform to a representation of the data symbols, and conveying a signal indicative of the communication symbols from the transmitter to the receiver.

The transform—when expressed as a transform matrix—has at least the following properties: that a ratio between number of zero-valued elements of the transform matrix and number of non-zero-valued elements of the transform matrix equals or exceeds a sparsity threshold, and that a number of columns of the transform matrix that has a zero-valued element sum equals or exceeds an angle distortion mitigation threshold.

In some embodiments, the sparsity threshold has a value which is equal to, or larger than, 0.5.

In some embodiments, the sparsity threshold has a value which is equal to $(2^N-(N+1))/2^N$ when the transform matrix has dimensionality $2^N \times 2^N$ wherein N is an integer larger than 2.

In some embodiments, the angle distortion mitigation threshold has a value which is equal to $2^N-1$ when the transform matrix has dimensionality $2^N \times 2^N$ wherein N is an integer larger than 2.

In some embodiments, the transform—when expressed as the transform matrix—has the further property that a scalar product between a pair of columns does not exceed an orthogonality threshold for at least some pairs of columns.

In some embodiments, the orthogonality threshold has a value of zero.

In some embodiments, the transform—when expressed as the transform matrix—has the further property of full rank.

In some embodiments, the transform—when expressed as the transform matrix—has the further property that all non-zero elements have a same absolute value.

In some embodiments, the transform matrix $C_N$ is defined by $$C_N = \prod_{n=1}^{N} \begin{bmatrix} H_2 \otimes I_{2^{N-n}} & 0_{2^{N-n+1} \times (2^N - 2^{N-n+1})} \\ 0_{(2^N - 2^{N-n+1}) \times 2^{N-n+1}} & I_{(2^N - 2^{N-n+1})} \end{bmatrix}$$

or any row- and/or column-wise permutation thereof, wherein N is an integer larger than 2, $$H_2 = \begin{bmatrix} 1 & 1 \\ 1 & -1 \end{bmatrix},$$

$I_M$ denotes an identity matrix with dimensions M×M, $0_{K \times L}$ denotes a matrix of dimensions K×L with all entries equal to zero, $\Pi[\cdot]$ denotes matrix multiplication, and $\otimes$ denotes a Kronecker product.

In some embodiments, the transform matrix $C_N$ is recursively defined by $$C_0 = [1], \quad C_n = \begin{bmatrix} C_{n-1} & I_{2^{n-1}} \\ C_{n-1} & -I_{2^{n-1}} \end{bmatrix}, 1 \leq n \leq N$$

or any row- and/or column-wise permutation thereof, wherein N is an integer larger than 2, and $I_M$ denotes an identity matrix with dimensions M×M.

In some embodiments, the signal indicative of the communication symbols is a constant envelope signal, and the constant envelope signal is angle modulated based on the transformed symbols.

In some embodiments when the method is performed by the transmitter, the method further comprises providing the communication symbols by applying the transform to amplitude representations of the data symbols, and conveying the signal indicative of the communication symbols comprises transmitting the signal.

In some embodiments when the method is performed by the transmitter, the method further comprises scaling the amplitude representations before applying the transform, wherein the scaling for an amplitude representation is based on non-zero element values of a corresponding column of the transform matrix.

In some embodiments when the method is performed by the transmitter, the method further comprises phase shifting the transformed symbols to provide the communication symbols, wherein the phase shifting mitigates discontinuities between communication symbols.

In some embodiments when the method is performed by the receiver, conveying the signal indicative of the communication symbols comprises receiving the signal, and the method further comprises estimating the data symbols by applying a reverse operation of the transform to angle representations of the received signal.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for transferring data symbols between a transmitter and a receiver. The apparatus comprises controlling circuitry configured to cause conveyance of a signal indicative of communication symbols from the transmitter to the receiver, wherein the communication symbols are specified by application of a transform to a representation of the data symbols.

The transform—when expressed as a transform matrix—has at least the following properties: that a ratio between number of zero-valued elements of the transform matrix and number of non-zero-valued elements of the transform matrix equals or exceeds a sparsity threshold, and that a number of columns of the transform matrix that has a zero-valued element sum equals or exceeds an angle distortion mitigation threshold.

In some embodiments, the apparatus is configured to be comprised in the transmitter, the controlling circuitry is further configured to cause provision of the communication symbols by application of the transform to amplitude representations of the data symbols, and conveyance of the signal indicative of the communication symbols comprises transmission of the signal.

In some embodiments, the apparatus is configured to be comprised in the receiver, conveyance of the signal indicative of the communication symbols comprises reception of the signal, and the controlling circuitry is further configured to cause estimation of the data symbols by application of a reverse operation of the transform to angle representations of the received signal.

A fourth aspect is a transmitter comprising the apparatus of the third aspect and transmission circuitry configured to transmit the signal, wherein the controlling circuitry is configured to cause provision of the communication symbols by application of the transform to amplitude representations of the data symbols.

A fifth aspect is a receiver comprising the apparatus of the third aspect and reception circuitry configured to receive the signal, wherein the controlling circuitry is configured to cause estimation of the data symbols by application of a reverse operation of the transform to angle representations of the received signal.

A sixth aspect is a communication device comprising one or more of: the apparatus of the third aspect, the transmitter of the fourth aspect, and the receiver of the fifth aspect.

In some embodiments, any of the above aspects may additionally have features identical with or corresponding to any of the various features as explained above for any of the other aspects.

An advantage of some embodiments is that alternative approaches to wireless communication are provided.

An advantage of some embodiments is that improvement over known approaches is provided in one or more of: data rate, error rate, robustness, power consumption, and complexity.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where approaches to wireless communication are provided, wherein the wireless communication comprises transferring data symbols between a transmitter and a receiver using a signal indicative of communication symbols.

Some embodiments are particularly suitable for low power IoT (Internet-of-Things) devices and/or wireless communication in accordance with one or more of: Bluetooth standard specification(s), IEEE 802.11 standard specification(s), and third generation partnership (3GPP) standard specification(s). It should be noted, however, that the approaches presented herein may be applicable also for other devices and/or standard specifications.

Some embodiments are particularly suitable for wireless communication using angle modulation (e.g., where the signal indicative of the communication symbols is a constant envelope signal, and the constant envelope signal is angle modulated). It should be noted, however, that the approaches presented herein may be applicable also for other modulation types.

Generally, the term "angle" as used herein refers to frequency or phase, or a combination thereof. Thus, angle modulation refers to any modulation where at least some (e.g., all) information is carried by the frequency and/or phase of the modulated signal.

Figure 1:
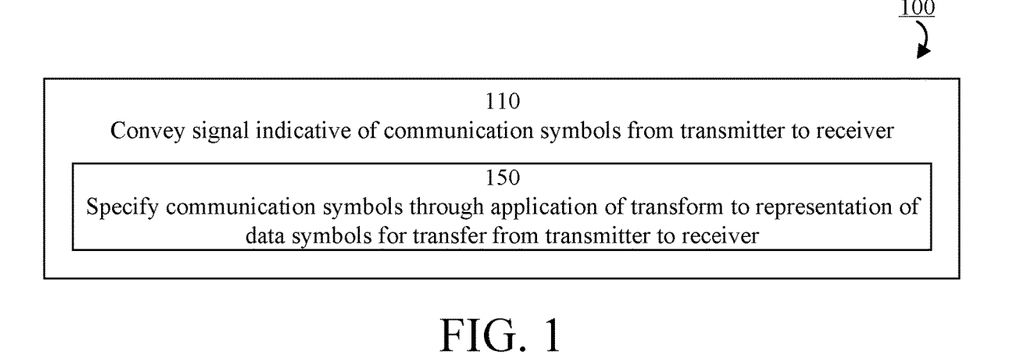
FIG. 1 is a flowchart illustrating example method steps according to some embodiments.

FIG. 1 illustrates an example method 100 according to some embodiments. The method 100 is for transferring data symbols between a transmitter and a receiver, and may be performed by the transmitter and/or the receiver.

The method 100 comprises conveying a signal indicative of communication symbols from the transmitter to the receiver, as illustrated by step 110. When the method 100 is performed by the transmitter, step 110 comprises transmitting the signal, and when the method 100 is performed by the receiver, step 110 comprises receiving the signal.

As illustrated by sub-step 150, the communication symbols are specified through application of a transform to a representation of the data symbols. When the method 100 is performed by the transmitter, the transform is applied before transmitting the signal, and when the method 100 is performed by the receiver, a reverse operation of the transform is applied after receiving the signal. If the transform is termed as a first transform, the reverse operation may be defined as a second transform, wherein application of the first transform followed by application of the second transform corresponds to application of the identity transform.

It should be noted that determination and/or generation of the transform may be performed by the device performing the method 100 (i.e., the method 100 may further comprise a step of determining and/or generating the transform), or determination and/or generation of the transform may be performed by another device and provided to the device performing the method 100. For example, the device performing the method 100 may have the pre-calculated transform stored in a memory, or the device performing the method 100 may acquire the transform by receiving a signal indicating the transform.

Generally, a transform may be expressed as a transform matrix, and various properties of a transform may be defined using the transform matrix.

The transform matrix for the transform of the method 100 will be exemplified herein by a transform matrix $C_N$ with dimensions $2^N \times 2^N$, where N is an integer larger than 2.

It should be noted, however, that the transform matrix can have any suitable dimension according to various embodiments. For example, the transform matrix may be a non-square matrix (i.e., with more columns than rows, or with more rows that columns). Alternatively or additionally, the number of columns and/or the number of rows is not necessarily a power of two. In some embodiments, the number of columns and/or the number of rows is an even number (i.e., a multiple of two).

It should also be mentioned that the expressions given herein for the transform matrix $C_N$ are merely examples and that other transform matrices fulfilling the properties as described herein are equally applicable according to various embodiments. For example, the non-zero elements of the transform matrix may belong to the set $\{\pm 1\}$ according to some embodiments (as for the example $C_N$ disclosed herein). However, the non-zero elements of other transform matrixes may belong to other (e.g., larger) sets while still fulfilling the properties as described herein.

Generally, the sparsity of a matrix (often expressed as a percentage value) may be defined as the ratio between the number of zero-valued elements of the matrix and the total number of elements of the matrix. For example, a matrix may be defined to be sparse if its sparsity is greater than or equal to 50%; meaning that at least half of the elements are zero-valued.

A first property of the transform matrix for the transform of the method 100 is that a ratio between number of zero-valued elements of the transform matrix and number of non-zero-valued elements of the transform matrix equals or exceeds a sparsity threshold.

Generally, the sparsity threshold has a value between zero and one (or, equivalently a percentage value between zero and one hundred), wherein a relatively high value is indicative of that the transform matrix has relatively few non-zero elements.

A suitable value for the sparsity threshold is 0.5. Other suitable values for the sparsity threshold include any value larger than 0.5 (e.g., a value larger than or equal to any of: 0.6, 0.7, 0.8, 0.9). For the example of a transform matrix $C_N$ with dimensions $2^N \times 2^N$, a suitable value for the sparsity threshold is $(2^N - (N+1))/2^N$, or a value (slightly) lower than $(2^N - (N+1))/2^N$.

The first property may have the advantage that the application of the transform can be implemented with low complexity (since the number of operations needed may be defined by the number of nonzero elements of the transform matrix).

A second property of the transform matrix for the transform of the method 100 is that a number of columns of the transform matrix that has a zero-valued element sum equals or exceeds an angle distortion mitigation threshold.

Generally, the angle distortion mitigation threshold has a value between zero and the number of columns of the transform matrix, wherein a relatively high value is indicative of that the transform matrix is configured to mitigate angle distortion to a relatively high extent.

A suitable value for the angle distortion mitigation threshold is any value larger than 0.5 (e.g., a value larger than or equal to any of: 0.6, 0.7, 0.8, 0.9). For example, a suitable value for the angle distortion mitigation threshold is the number of columns of the transfer matrix minus one. Thus, for the example of a transform matrix $C_N$ with dimensions $2^N \times 2^N$, a suitable value for the angle distortion mitigation threshold is $2^N - 1$. This means that all columns but one (e.g., the first column) has zero-valued element sum.

The second property may have the advantage that the error rate for information carried by the signal is reduced (since there is no cross talk between rows of the transform matrix for columns with zero-valued sum and, consequently, no corresponding interference between communication symbols).

For example, when the transform is used in the context of angle modulation, the second property may lead to that an angular error is eliminated (or at least counteracted/mitigated) in the receiver. This will be further exemplified later herein, and is achievable without pilot signaling or differential modulation.

Generally, an angular error may, for example, be due to angular noise and/or mismatches between transmitter and receiver (e.g., oscillator mismatch).

A third (optional) property of the transform matrix for the transform of the method 100 is that a scalar product between a pair of columns does not exceed an orthogonality threshold for at least some (e.g., all) pairs of columns.

Generally, the orthogonality threshold has a value between zero and one, wherein a zero value is indicative of that the columns of the pair are orthogonal and a relatively low non-zero value is indicative of that the columns of the pair are close to orthogonal.

A suitable value for the orthogonality threshold is zero. Other suitable values for the orthogonality threshold include any value lower than 0.1 (e.g., a value lower than or equal to any of: 0.09, 0.08, 0.07, 0.06, 0.05).

The third property may have the advantage that the error rate for information carried by the signal is reduced (since there is no cross talk between orthogonal columns of the transform matrix and, consequently, no inter-symbol interference between data symbols).

A fourth (optional) property of the transform matrix for the transform of the method 100 is that the transform matrix has full rank.

The fourth property may have the advantage that the full information carrying potential of the communication symbols is used (since a transform matrix of full rank spans all dimensions of the communication symbol space).

A fifth (optional) property of the transform matrix for the transform of the method 100 is that all non-zero elements of the transform matrix have a same absolute value (e.g., all non-zero elements may belong to the set $\{\pm 1\}$).

The fifth property may have the advantage that it enables low complexity digital implementations of the transform. For example, multiplications are not required when the non-zero elements belong to the set $\{\pm 1\}$.

An example of a transform matrix $C_N$ with dimensions $2^N \times 2^N$ which fulfills the first through fifth properties as elaborated on above is defined by $$C_N = \prod_{n=1}^{N} \begin{bmatrix} H_2 \otimes I_{2^{N-n}} & 0_{2^{N-n+1} \times (2^N - 2^{N-n+1})} \\ 0_{(2^N - 2^{N-n+1}) \times 2^{N-n+1}} & I_{(2^N - 2^{N-n+1})} \end{bmatrix}$$

where N is an integer larger than 2, $$H_2 = \begin{bmatrix} 1 & 1 \\ 1 & -1 \end{bmatrix}$$

(the discrete Fourier transform, DFT, matrix of dimension two), $I_M$ denotes an identity matrix with dimensions M×M, $0_{K \times L}$ denotes a matrix of dimensions K×L with all entries equal to zero, $\Pi[\cdot]$ denotes matrix multiplication, and $\otimes$ denotes a Kronecker product. The notations $I_0$, $0_{K \times 0}$, and $0_{0 \times L}$ denote the empty matrix.

A definition via matrix factorization (e.g., according to the above expression) may be useful because it enables computationally efficient multiplication of the matrix with a vector (e.g., a vector representing data symbols in the transmitter). Furthermore, definition via matrix factorization may also provide an approach for calculation of the computational complexity of such a multiplication.

An alternative definition of the transform matrix $C_N$ is via the recursion $$C_0 = [1], \quad C_n = \begin{bmatrix} C_{n-1} & I_{2^{n-1}} \\ C_{n-1} & -I_{2^{n-1}} \end{bmatrix}, \quad 1 \leq n \leq N.$$

It should be noted that any row- and/or column-wise permutation of a transform matrix (e.g., $C_N$ as defined by the above expressions, or any other transform matrix fulfilling at least the first and second properties) is typically also a transform matrix fulfilling the same properties as the original transform matrix. This applies to single-step permutations (permuting only columns, or only rows) as well as to multi-step permutations (permuting columns and/or rows in two or more subsequently performed steps; e.g., first row permutation, first column permutation, second row permutation, etc.).

The transform matrix $C_N$ defined via the above matrix factorization expression will now be exemplified for N=4. The corresponding transform matrix $C_4$ has dimensions $2^4 \times 2^4 = 16 \times 16$ and is defined as a matrix product of 4 factor matrices denoted $C_{4,1}$, $C_{4,2}$, $C_{4,3}$, and $C_{4,4}$; i.e., $C_4 = C_{4,1} C_{4,2} C_{4,3} C_{4,4}$, where $C_4$ has the following elements:

| 1 | 1 | 1 | 0 | 1 | 0 | 0 | 0 | 1 | 0 | 0 | 0 | 0 | 0 | 0 | 0 |
|---|---|---|---|---|---|---|---|---|---|---|---|---|---|---|---|
| 1 | -1 | 0 | 1 | 0 | 1 | 0 | 0 | 0 | 1 | 0 | 0 | 0 | 0 | 0 | 0 |
| 1 | 1 | -1 | 0 | 0 | 0 | 1 | 0 | 0 | 0 | 1 | 0 | 0 | 0 | 0 | 0 |
| 1 | -1 | 0 | -1 | 0 | 0 | 0 | 1 | 0 | 0 | 0 | 1 | 0 | 0 | 0 | 0 |
| 1 | 1 | 1 | 0 | -1 | 0 | 0 | 0 | 0 | 0 | 0 | 0 | 1 | 0 | 0 | 0 |
| 1 | -1 | 0 | 1 | 0 | -1 | 0 | 0 | 0 | 0 | 0 | 0 | 0 | 1 | 0 | 0 |
| 1 | 1 | -1 | 0 | 0 | 0 | -1 | 0 | 0 | 0 | 0 | 0 | 0 | 0 | 1 | 0 |
| 1 | -1 | 0 | -1 | 0 | 0 | 0 | -1 | 0 | 0 | 0 | 0 | 0 | 0 | 0 | 1 |
| 1 | 1 | 1 | 0 | 1 | 0 | 0 | 0 | -1 | 0 | 0 | 0 | 0 | 0 | 0 | 0 |
| 1 | -1 | 0 | 1 | 0 | 1 | 0 | 0 | 0 | -1 | 0 | 0 | 0 | 0 | 0 | 0 |
| 1 | 1 | -1 | 0 | 0 | 0 | 1 | 0 | 0 | 0 | -1 | 0 | 0 | 0 | 0 | 0 |
| 1 | -1 | 0 | -1 | 0 | 0 | 0 | 1 | 0 | 0 | 0 | -1 | 0 | 0 | 0 | 0 |
| 1 | 1 | 1 | 0 | -1 | 0 | 0 | 0 | 0 | 0 | 0 | 0 | -1 | 0 | 0 | 0 |
| 1 | -1 | 0 | 1 | 0 | -1 | 0 | 0 | 0 | 0 | 0 | 0 | 0 | -1 | 0 | 0 |
| 1 | 1 | -1 | 0 | 0 | 0 | -1 | 0 | 0 | 0 | 0 | 0 | 0 | 0 | -1 | 0 |
| 1 | -1 | 0 | -1 | 0 | 0 | 0 | -1 | 0 | 0 | 0 | 0 | 0 | 0 | 0 | -1 |

$C_{4,1}$ has the following elements:

| 1 | 0 | 0 | 0 | 0 | 0 | 0 | 0 | 1 | 0 | 0 | 0 | 0 | 0 | 0 | 0 |
|---|---|---|---|---|---|---|---|---|---|---|---|---|---|---|---|
| 0 | 1 | 0 | 0 | 0 | 0 | 0 | 0 | 0 | 1 | 0 | 0 | 0 | 0 | 0 | 0 |
| 0 | 0 | 1 | 0 | 0 | 0 | 0 | 0 | 0 | 0 | 1 | 0 | 0 | 0 | 0 | 0 |
| 0 | 0 | 0 | 1 | 0 | 0 | 0 | 0 | 0 | 0 | 0 | 1 | 0 | 0 | 0 | 0 |
| 0 | 0 | 0 | 0 | 1 | 0 | 0 | 0 | 0 | 0 | 0 | 0 | 1 | 0 | 0 | 0 |
| 0 | 0 | 0 | 0 | 0 | 1 | 0 | 0 | 0 | 0 | 0 | 0 | 0 | 1 | 0 | 0 |
| 0 | 0 | 0 | 0 | 0 | 0 | 1 | 0 | 0 | 0 | 0 | 0 | 0 | 0 | 1 | 0 |
| 0 | 0 | 0 | 0 | 0 | 0 | 0 | 1 | 0 | 0 | 0 | 0 | 0 | 0 | 0 | 1 |
| 1 | 0 | 0 | 0 | 0 | 0 | 0 | 0 | -1 | 0 | 0 | 0 | 0 | 0 | 0 | 0 |
| 0 | 1 | 0 | 0 | 0 | 0 | 0 | 0 | 0 | -1 | 0 | 0 | 0 | 0 | 0 | 0 |
| 0 | 0 | 1 | 0 | 0 | 0 | 0 | 0 | 0 | 0 | -1 | 0 | 0 | 0 | 0 | 0 |
| 0 | 0 | 0 | 1 | 0 | 0 | 0 | 0 | 0 | 0 | 0 | -1 | 0 | 0 | 0 | 0 |

-continued

| 0 | 0 | 0 | 0 | 1 | 0 | 0 | 0 | 0 | 0 | 0 | 0 | -1 | 0 | 0 | 0 |
|---|---|---|---|---|---|---|---|---|---|---|---|----|---|---|---|
| 0 | 0 | 0 | 0 | 0 | 1 | 0 | 0 | 0 | 0 | 0 | 0 | 0 | -1 | 0 | 0 |
| 0 | 0 | 0 | 0 | 0 | 0 | 1 | 0 | 0 | 0 | 0 | 0 | 0 | 0 | -1 | 0 |
| 0 | 0 | 0 | 0 | 0 | 0 | 0 | 1 | 0 | 0 | 0 | 0 | 0 | 0 | 0 | -1 |

$C_{4,2}$ has the following elements:

| 1 | 0 | 0 | 0 | 1 | 0 | 0 | 0 | 0 | 0 | 0 | 0 | 0 | 0 | 0 | 0 |
|---|---|---|---|---|---|---|---|---|---|---|---|---|---|---|---|
| 0 | 1 | 0 | 0 | 0 | 1 | 0 | 0 | 0 | 0 | 0 | 0 | 0 | 0 | 0 | 0 |
| 0 | 0 | 1 | 0 | 0 | 0 | 1 | 0 | 0 | 0 | 0 | 0 | 0 | 0 | 0 | 0 |
| 0 | 0 | 0 | 1 | 0 | 0 | 0 | 1 | 0 | 0 | 0 | 0 | 0 | 0 | 0 | 0 |
| 1 | 0 | 0 | 0 | -1 | 0 | 0 | 0 | 0 | 0 | 0 | 0 | 0 | 0 | 0 | 0 |
| 0 | 1 | 0 | 0 | 0 | -1 | 0 | 0 | 0 | 0 | 0 | 0 | 0 | 0 | 0 | 0 |
| 0 | 0 | 1 | 0 | 0 | 0 | -1 | 0 | 0 | 0 | 0 | 0 | 0 | 0 | 0 | 0 |
| 0 | 0 | 0 | 1 | 0 | 0 | 0 | -1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 1 |

$C_{4,3}$ has the following elements:

| 1 | 0 | 1 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 1 | 0 | 1 | 0 | 0 | 0 | 0 | 0 | 0 | 0 | 0 | 0 | 0 | 0 | 0 |
| 1 | 0 | -1 | 0 | 0 | 0 | 0 | 0 | 0 | 0 | 0 | 0 | 0 | 0 | 0 | 0 |
| 0 | 1 | 0 | -1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 1 |

$C_{4,4}$ has the following elements:

| 1 | 1 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 1 | -1 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 1 |

The computational complexity of multiplication of the factorized matrix $C_4$ with a vector may be determined by inspection; considering additions and subtractions of elements as equivalent operations in terms of complexity. Multiplication of $C_{4,4}$ with a real-valued vector requires two such operations, multiplication of $C_{4,3}$ with a real-valued vector requires four such operations, multiplication of $C_{4,2}$ with a real-valued vector requires eight such operations, and multiplication of $C_{4,1}$ with a real-valued vector requires sixteen such operations. Thus, multiplication of the factorized matrix $C_4$ with a vector requires $2+4+8+16=2\cdot 2^4-2=30$ real-valued additions/subtractions, and no multiplications.

Generally, multiplication of $C_N$ as defined above with a real-valued vector requires $2\cdot 2^N-2$ real additions/subtractions, and no multiplications. Thus, the complexity is $\mathcal{O}(2^N)$, which means that it grows linearly with the dimensionality of the transform matrix. As a comparison, implementation for the fast Hadamard transform or for the fast Fourier transform (FFT) with the dimensionality requires $\mathcal{O}(N2^N)$ operations.

The transform matrices $C_N$ as defined above have some useful properties as presented in the following items A through E:

A. $C_N$ has full rank.
B. The columns of $C_N$ are orthogonal.
C. $C_N$ is sparse for $N\geq 3$; using the definition that at least half of the elements should be zero-valued.
D. The sum of the elements of any column of $C_N$ is zero; with the exception of the first column.
E. The number of non-zero elements in $C_N$ is $(N+1)2^N$; leading to sparsity being equal to $$\frac{2^{2N}-(N+1)2^N}{2^{2N}} = \frac{2^N-(N+1)}{2^N}.$$

Item A corresponds to an exemplification of the earlier-defined fourth property, item B corresponds to an exemplification of the earlier-defined third property, item C corresponds to an exemplification of the earlier-defined first property, item D corresponds to an exemplification of the earlier-defined second property, and item E further specifies the exemplification of the earlier-defined first property. Furthermore, the transform matrices $C_N$ as defined above fulfills the earlier-defined fifth property.

Figure 2:
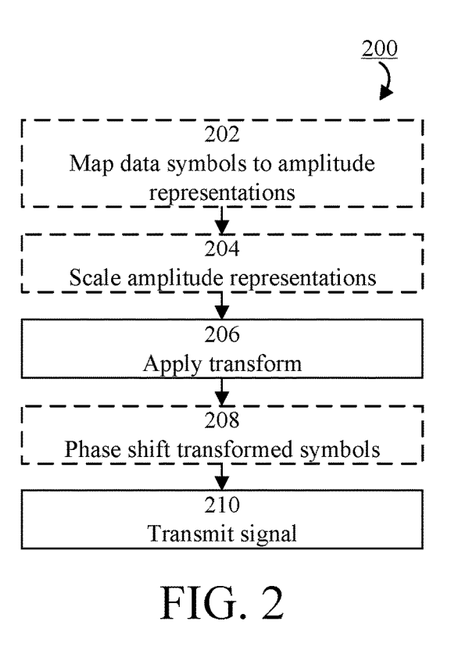
FIG. 2 is a flowchart illustrating example method steps according to some embodiments.

FIG. 2 illustrates an example method 200 according to some embodiments. The method 200 is performed by a transmitter for transferring data symbols between the transmitter and a receiver, and may be seen as an exemplification of the method 100 of FIG. 1.

In optional step 202, the data symbols are mapped to amplitude representations (e.g., to pulse amplitude modulation, PAM, symbols). In some embodiments, the data symbols are already represented in terms of amplitude and step 202 can be omitted.

In optional step 204, the amplitude representations are scaled. The scaling for an amplitude representation may be based on non-zero element values of a corresponding column of the transform matrix.

The scaling may have an equalization effect over the different data symbols. For example, when the number of non-zero elements in the transform matrix differs between different columns (or more generally, when the column-wise sum of absolute element values of the transform matrix differs between columns), different data symbols will be assigned different amount of transmission power, which can be compensated by the scaling of step 204.

A potential drawback with the scaling of 204 is spectrum widening. Thus, step 204 may comprise a trade-off between equalization and spectrum width, according to some embodiments.

In step 206, the transform is applied to the (possibly scaled) amplitude representations of the data symbols (compare with sub-step 150 of FIG. 1). For example, application of the transform may be implemented as multiplication of the transform matrix with a vector comprising the amplitude representations of the data symbols.

In some embodiments, steps 204 and 206 may be combined such that the transform includes the scaling. For example, the transform may be defined such that the transform matrix has equal column-wise sums of absolute element values for all columns (or has column-wise sums of absolute element values within a specified range for all columns).

In optional step 208, the transformed symbols are phase shifted. The phase shifting may be mitigating discontinuities between communication symbols to be transmitted. For example, each transformed symbol may be phase shifted so that its initial phase equals the final phase of the directly preceding transformed symbol (or so that its initial phase is within a specified range from the final phase of the directly preceding transformed symbol).

Additionally or alternatively, a time window may be applied for each boundary between transformed symbol, wherein the phase is interpolated (or otherwise smoothed) within the time window. A potential drawback with the approach using a time window is that information may be lost in the smoothing process (if the time window partially overlaps with the transformed symbols) and/or that the time dimension throughput is decreased (if the time window introduces a time gap between transformed symbols).

The method 200 provides the communication symbols based on the transformed symbols (e.g., the transformed symbols may be used directly as communication symbols or the phase shifted transformed symbols may be used as communication symbols).

In step 210, a signal indicative of the communication symbols is transmitted, thereby conveying the signal to the receiver (compare with step 110 of FIG. 1). For example, the signal indicative of the communication symbols may be a constant envelope signal, angle modulated based on the transformed symbols.

Figure 3:
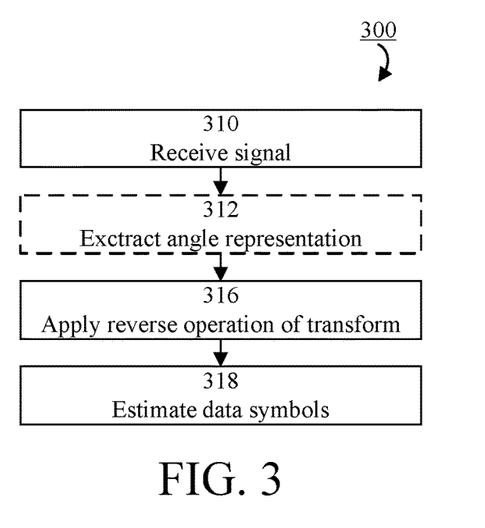
FIG. 3 is a flowchart illustrating example method steps according to some embodiments.

FIG. 3 illustrates an example method 300 according to some embodiments. The method 300 is performed by a receiver for transferring data symbols between a transmitter and the receiver, and may be seen as an exemplification of the method 100 of FIG. 1 and/or as a counterpart to the method 200 of FIG. 2.

In step 310, a signal indicative of communication symbols is received, thereby conveying the signal from the transmitter (compare with step 110 of FIG. 1). For example, the signal indicative of the communication symbols may be a constant envelope signal, angle modulated based on the transformed symbols.

In optional step 312, an angle representation of the received signal is extracted (applicable for angle modulated signals).

In step 316, a reverse operation of the transform is applied to (e.g., angle) representations of the received signal (compare with sub-step 150 of FIG. 1). For example, application of the reverse operation of the transform may be implemented as multiplication of a transpose of the transform matrix with a vector comprising the representations of the received signal.

In step 318, the data symbols are estimated based on the result of step 316 (e.g., by demapping amplitude values resulting from application of the reverse operation of the transform to soft or hard estimations of the data symbols).

Various embodiments will now be described in the context of constant envelope modulation (which may constitute one type of angle modulation) for multicarrier communication. In this context, a transform as described above may be used to for precoding before the constant envelope modulation.

The power amplifier (PA) is typically one of the most power-hungry blocks in a transceiver. The design of a PA typically involves trade-offs (e.g., linearity vs. power efficiency, and/or spectral efficiency vs. power efficiency). Typically, power efficiency is highest at peak envelope (i.e., output) power (PEP), and decreases as the output power decreases. Constant envelope signals are beneficial because they enable the PA to be durably operated at its PEP; resulting in high power efficiency.

As already indicated, angle modulation can refer to a process of modulating the phase and/or the frequency of a carrier. Angle modulated signals typically have constant envelope, and are often used in applications where high power efficiency, low hardware complexity, low implementation complexity, and/or low cost is desired.

Multicarrier modulation techniques (e.g., orthogonal frequency division multiplexing, OFDM) may be well suited for applications that require high spectral efficiency and/or moderate to high data rates. However, multicarrier modulation techniques typically exhibit large amplitude variations. Hence, multi-carrier modulation signals typically have the drawback of requiring the PA to operate at a wide range of output power values. Therefore, the PA is typically required to have high linearity in relation to such signals; to avoid distorting the signal. Further, the PA typically operates in relation to such signals at an average output power level which is well below the PEP; resulting in low power efficiency.

Thus, it may be desirable to find a way to achieve benefits of multicarrier modulation for a constant envelope signal.

To this end, constant envelope OFDM (CE-OFDM) has been proposed. For example, "Constant Envelope OFDM" by S. C. Thompson, A. U. Ahmed, J. G. Proakis, J. R. Zeidler and M. J. Geile; in IEEE Transactions on Communications, vol. 56, no. 8, pp. 1300-1312, August 2008, describes a transform technique where inverse discrete Fourier transform (IDFT) is used for communication (i.e., the phase of the signal is defined by the IDFT).

CE-OFDM may be seen as a memoryless angle modulation scheme, where the phase of a signal is generated by means of a multicarrier signal. Since CE-OFDM signals have constant envelope, the PA can be operated at its PEP, while the multicarrier nature of the phase can enable moderate to high data rates.

In contrast to conventional OFDM, the IDFT output typically needs to be real-valued for CE-OFDM (since it is used as the phase of the baseband signal). To this end, the user code bits (data symbols) may be mapped to quadrature amplitude modulation (QAM) symbols having a complex conjugate symmetry which causes the resulting IDFT to be real-valued. Modulation and/or demodulation may be implemented in the digital domain by means of inverse fast Fourier transform (IFFT) and fast Fourier transform (FFT), respectively.

In "Constant Envelope Phase Modulation Inspired by Orthogonal Waveforms" by Y. Balal, M. Pinchas and Y. Pinhasi; in IEEE Communications Letters, vol. 20, no. 11, pp. 2169-2172, November 2016, the concept of CE-OFDM is varied in that user code bits are mapped to PAM symbols, which are multiplied by a Hadamard matrix before being used for phase modulation.

CE-OFDM, or a variant thereof, may be applicable as the basis for the physical layer (PHY) of short-range technologies (e.g., such as IEEE 802.11 or Bluetooth); especially if requirements evolve towards one or more of: increasing power efficiency, decreasing hardware complexity, decreasing implementation complexity, decreased cost, and increasing data rate.

However, using FFT or Hadamard transform may imply a non-negligibly high complexity. Hence, it may be desirable to find an approach that offers the same advantages as CE-OFDM in terms of data rates and PA efficiency, but has lower complexity than CE-OFDM using FFT or Hadamard transform. This is achieved according to some embodiments.

Aiming at this purpose, some embodiments introduce transforms (to be applied at the transmitter and/or the receiver) defined through a family of precoding matrices. The transforms enable an improved precoded angle modulation approach.

In some embodiments, the precoder matrices are sparse (i.e., consist of mostly of zero-valued elements), have orthogonal columns, and have column-wise element sums which are equal to zero for all columns except one.

The sparsity typically entails that the precoding operation has a computational complexity that is relatively low (e.g., linearly dependent of the dimension of the matrix; which is an improvement compared to the FFT and Hadamard transforms).

The orthogonality typically entails that it is possible to design a receiver with high performance and/or low complexity.

The property of the column-wise sums typically entails that the receiver tolerates phase errors and/or frequency errors (which may occur, e.g., due to mismatches between oscillators of the transmitter and the receiver, and/or due to local oscillator drift).

Figure 4:
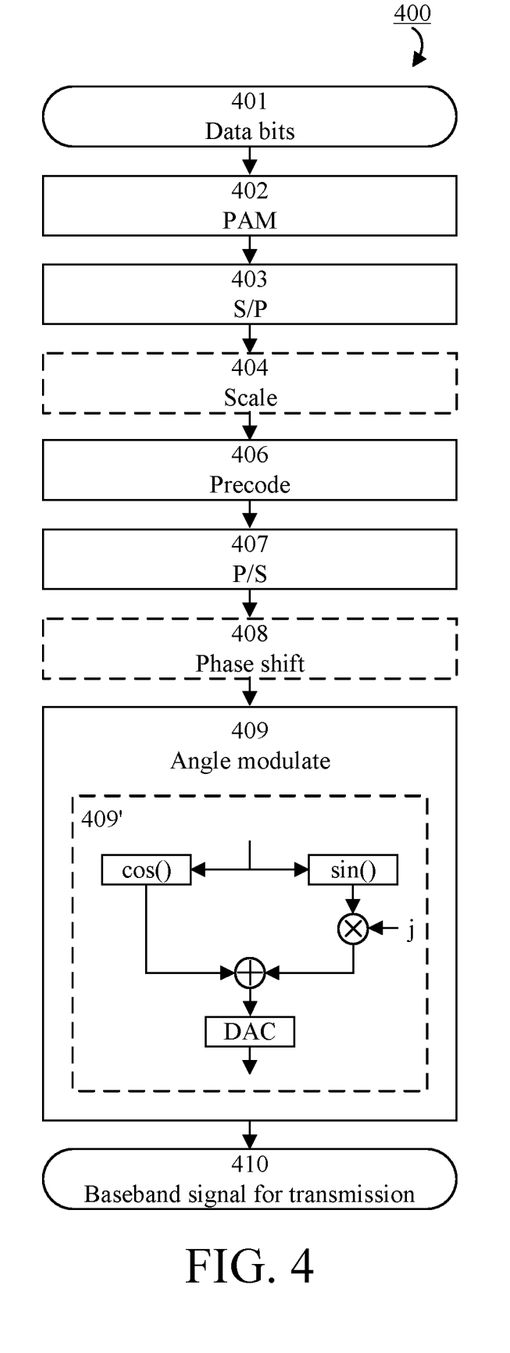
FIG. 4 is a flowchart illustrating example method steps according to some embodiments.

FIG. 4 illustrates an example method 400 according to some embodiments, which is specifically suitable in the context of constant envelope modulation for multicarrier communication. The method 400 is performed by a transmitter and may, for example, be seen as an exemplification of any of the methods described in connection to FIGS. 1 and 2. Furthermore, the method 400 may be used as a functional block diagram for transmitter implementation.

Data bits (an example of data symbols; e.g., user code bits) are input to the method 400 as illustrated by 401.

In step 402, the data bits are mapped to PAM symbols (an exemplification of amplitude representations; compare with step 202 of FIG. 2).

The PAM symbols are parallelized in step 403; typically in group sizes that corresponds to the number of carriers and/or to the number of columns in the transform matrix.

In optional step 404, the parallelized PAM symbols may be scaled (e.g., for power equalization; compare with step 204 of FIG. 2).

Precoding is performed in step 406 by application of the transform (e.g., multiplying the transform matrix $C_N$ with a vector representation of the parallelized, and possibly scaled, PAM symbols; compare with step 206 of FIG. 2).

The transformed symbols are serialized in step 407.

In optional step 408, the serialized transformed symbols may be phase shifted (e.g., for mitigating discontinuities between communication symbols to be transmitted; compare with step 208 of FIG. 2).

The communication symbols (here; the transformed, and possibly phase shifted, symbols) are used for angle modulation in step 409. As exemplified by 409', a possible implementation of the angle modulation comprises using each of the communication symbols to set the phase of a complex-valued input to a digital-to-analog converter (DAC); i.e., to use each of the communication symbols as the phase for modulation.

An analog baseband signal (an example of a signal indicative of the communication symbols) is output from the method 400 as illustrated by 410, and can be used for transmission (compare with step 210 of FIG. 2).

In some embodiments, interpolation/up-sampling may be applied between steps 407 and 408 as a step on the way to provision of the analog baseband signal.

The following is one possible description of some embodiments using the method 400 of FIG. 4:

- 402: PAM mapping. A stream of user code bits are mapped to PAM symbols (real-valued).
- 403: Serial to parallel. The PAM symbols are grouped into groups of length $2^N$ (where N is a system design parameter). In some embodiments, the first PAM symbol in each group is set to zero to avoid direct current (DC) components.
- 404: Power scaling (optional block). Variance in the group of PAM symbols may impact performance and signal bandwidth. Increased variance typically results in improved performance; at the cost of increased signal bandwidth, and vice versa. Thus, the power scaling may be subject to a trade-off between performance and signal bandwidth. The individual PAM symbols in a group may be power scaled equally or in-equally.
- 406: Precoding. Each group of PAM symbols is precoded. This is achieved by considering the group as a real-valued vector and multiplying it by the precoding matrix $C_N$. Since the number of zeros in the columns of $C_N$ vary, the precoded PAM symbols might not have the same power. Equal power among the precoded PAM symbols may be achieved by the individually scaling the PAM symbols in a group (e.g., in 404).
- 407: Parallel to serial. The groups of precoded PAM symbols are converted back to serial representation.
- Interpolation (optional block). The precoded PAM symbol stream is upsampled.
- 408: Phase shifting (optional block). Each group of precoded PAM symbols determines the phase trajectory of the baseband signal during a time period (e.g., denoted precoded symbol period; or communication symbol period). Discontinuities may arise between the end of one precoded symbol period and the beginning of the next precoded symbol period. One purpose of the phase shifting block is to remove such discontinuities. This can be achieved by shifting the phase trajectory for each precoded symbol period so that it starts with the same phase value as the phase value that ended the previous precoded symbol period. Thus, this block may reduce the occupied bandwidth.
- 409: Angle modulation. A constant envelope baseband signal is generated, the phase of which equals the modulated phase output of the phase shifting block.

Figure 5:
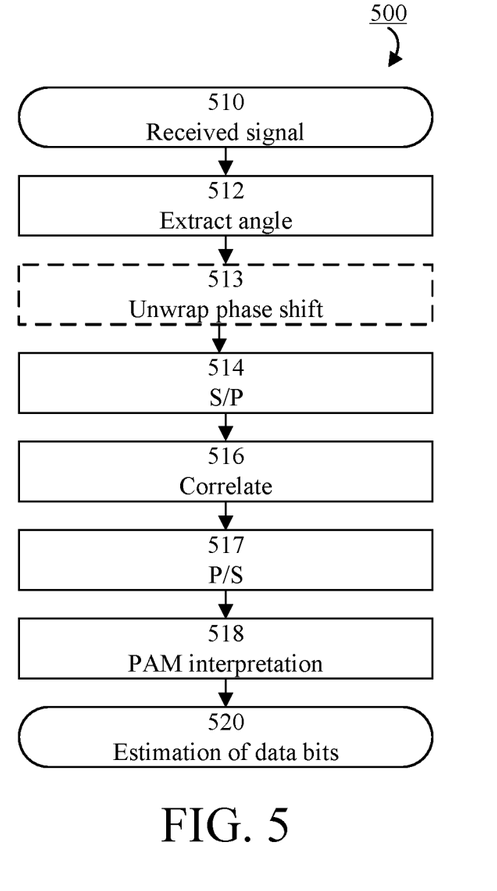
FIG. 5 is a flowchart illustrating example method steps according to some embodiments.

FIG. 5 illustrates an example method 500 according to some embodiments, which is specifically suitable in the context of constant envelope modulation for multicarrier communication. The method 500 is performed by a receiver and may, for example, be seen as an exemplification of any of the methods described in connection to FIGS. 1 and 3 and/or as a counterpart to the method 400 of FIG. 4. Furthermore, the method 500 may be used as a functional block diagram for receiver implementation.

A received signal (compare with step 310 of FIG. 3) is input to the method 500 as illustrated by 510.

In step 512, angles (an example of angle representations) are extracted from the received signal for each of the communication symbols (e.g., for each precoded symbol period; compare with step 312 of FIG. 3).

In optional step 513, phase shifts (e.g., as introduced according to step 408 of FIG. 4) are unwrapped.

The, possibly unwrapped, angle representations are parallelized in step 514; typically in group sizes that corresponds to the number of carriers and/or to the number of columns in the reverse operation of the transform matrix.

Correlation is performed in step 516 by application of the reverse operation of the transform (e.g., multiplying the transposed transform matrix $C_N^T$ with a vector representation of the parallelized, and possibly unwrapped, angle representations; compare with step 316 of FIG. 3).

The transformed symbols are serialized in step 517.

The transformed symbols are interpreted in step 518 (e.g., demapping based on the PAM scheme applied in step 402 of FIG. 402, possibly compensating for the scaling in step 404 of FIG. 4; compare with step 318 of FIG. 3).

The resulting estimation of data bits (an example of data symbols; e.g., user code bits) is output from the method 500 as illustrated by 520.

The following is one possible description of some embodiments using the method 500 of FIG. 5:

- 512: Angle. Since angle modulation is used, this step extracts the phase of the received baseband signal.
- 513: Unwrap. The phase is unwrapped to eliminate phase jumps (discontinuities).
- 514: Serial to parallel. The thus achieved received signal samples are grouped into groups of length $2^N$ (where N is a system design parameter).
- 516: Correlator. The received signal samples are correlated with the columns of the precoding matrix. This may be achieved by multiplying a vector comprising the received signal samples by the transpose of the precoding matrix. The output of this block are estimates of the PAM symbols.
- 517: Parallel to serial.
- 518: PAM demapping. The output of this block are soft or hard bit estimations.

To illustrate the operation of the transmitter and receiver in relation to FIGS. 4 and 5, it may be assumed that the digital received signal r(n) is modelled as $$r(n)=\exp(j(\theta+\omega n))\cdot x(n)+w(n),$$

where x(n) is the desired signal, w(n) is a noise term, θ is an arbitrary phase shift, and ω represents the mismatch between transmitter and receiver oscillators. The desired signal can be written as x(n)=exp (jp(n)), where p(n) represents the precoded, and possibly power scaled, PAM symbols. After phase extraction and unwrapping, the phase a(n) is obtained as:

$$a(n)=\theta+\omega n+p(n)+v(n),$$

where v(n) is a noise term corresponding to w(n). It might also be assumed that the precoded symbol period is much smaller than the reciprocal of ω, in which case the term ωn can be replaced by a term Ω that is constant over a precoded symbol period (but may vary from one precoded symbol period to another).

It might be convenient to express the received signal in vector form. Using the notations $$\vec{a} = [a(1), a(2), \ldots, a(2^N)]^T$$

$$\vec{p} = [p(1), p(2), \ldots, p(2^N)]^T$$

$$\vec{v} = [v(1), v(2), \ldots, v(2^N)]^T$$

and defining $\vec{1}_{2^N}$ to be a column vector of length $2^N$ comprising only ones, the unwrapped phase of the received signal may be expressed as $$\vec{a} = \vec{p} + (\theta + \Omega)\vec{1}_{2^N} + \vec{v}.$$

Denoting the power scaled PAM symbols as $\vec{P} = [P(1), P(2), \ldots, P(2^N)]^T$, the precoded PAM symbols are $\vec{p} = C_N \cdot \vec{P}$, and correlating the phase of the received signal $\vec{a}$ with the columns of the precoding matrix yields $$\vec{R} := C_N^T \cdot \vec{a} = C_N^T \cdot \vec{p} + C_N^T \cdot (\theta + \Omega)\vec{1}_{2^N} + \vec{\zeta},$$

where $\vec{\zeta} = C_N^T \cdot \vec{v}$ is a noise term.

It may be convenient to choose $P_1 = 0$ to simplify the receiver algorithms. The first term of $\vec{R}$ may be reformulated as $C_N^T \cdot \vec{p} = C_N^T \cdot C_N \cdot P = \Lambda \cdot \vec{P}$, where $\Lambda = \text{diag}(\lambda_1, \lambda_2, \ldots, \lambda_{2^N})$ is a known diagonal matrix. Moreover, $C_N^T \cdot \vec{1}_{2^N}$ is a vector comprising the sum of the columns of $C_N$, which is zero for all columns but the first. Hence, $\vec{R}$ can be used by the PAM demapping since $P_1 = 0$ and $R(n) = \lambda_n P(n) + \zeta(n)$, $n = 2, \ldots, 2^N$.

Thus, the receiver can handle intrinsically non-coherent detection because the correlation block projects any phase θ to zero; and is robust to oscillator mismatch (e.g., due to inaccuracies in synchronization and/or instabilities inherent to low cost oscillators) because the correlation projects slowly varying phase errors on to zero.

Figure 6:
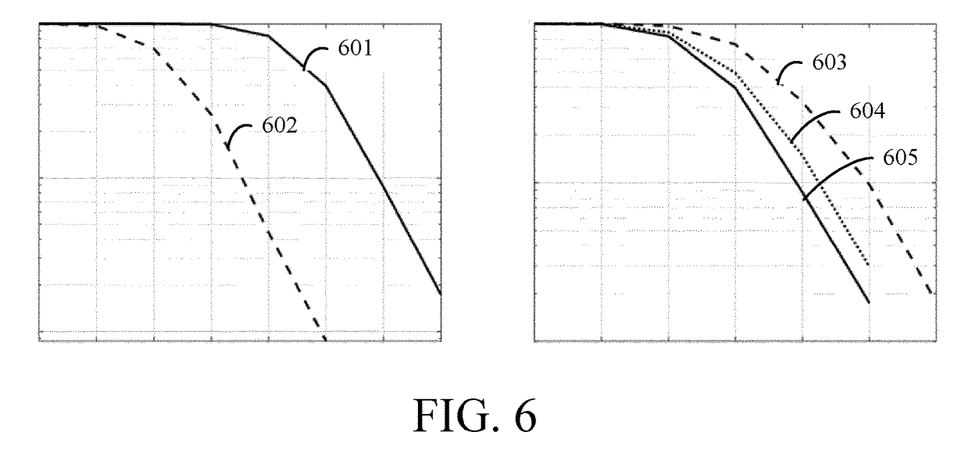
FIG. 6 is a collection of plots illustrating example results achievable by application of some embodiments.

FIG. 6 shows two plots illustrating example results achievable by application of some embodiments. The results have been achieved by simulations; considering an OFDM system having sampling rate Fs=2 MHz, subcarrier spacing 125 kHz, modulation 8-PSK, no coding, multicarrier symbol duration 8 μs, and packet duration 376 μs. The OFDM system is compared to a system implemented according to the embodiments described in connection to FIGS. 4 and 5, with sampling rate Fs=2 MHz, precoding matrix C₄ as disclosed above, modulation 8-PAM, no coding, precoded symbol period 8 μs, packet duration 376 μs, and phase variance 1.3.

The performance of the OFDM system (602) and the system implemented according to the embodiments described in connection to FIGS. 4 and 5 (601) is shown in the left plot of FIG. 6 for Additive White Gaussian Noise (AWGN) channel. The x-axis shows signal-to-noise ratio (SNR) values from 13 to 20 dB and the y-axis shows packet error rate (PER) in logarithmic scale from $10^{-2}$ to $10^0$. In this example, a packet has a duration of 376 μs corresponding to 47 symbols (each with $2^N$ data symbols. It can be seen that the packet error rate of the OFDM system is approximately 2 dB lower than that of the system implemented according to the embodiments described in connection to FIGS. 4 and 5. However, if the transmitter is transmitting at full power, the OFDM system typically has to be backed off due to amplitude variations; to avoid signal compression. A typically required back-off could be approximately 5 dB. Hence, the system implemented according to the embodiments described in connection to FIGS. 4 and 5 could have approximately 5 dB higher output power (when using a similar PA), resulting in an advantage of 5−2=3 dB.

The right plot of FIG. 6 shows degradation of performance for the system implemented according to the embodiments described in connection to FIGS. 4 and 5 when there is a mismatch between transmitter and receiver oscillators, and no attempt is made in the receiver to correct the resulting frequency error. The x-axis shows signal-to-noise ratio (SNR) values from 15 to 21 dB and the y-axis shows packet error rate (PER) in logarithmic scale from $10^{-2}$ to $10^0$. Results are shown for mismatches of 0 kHz (603), 1.5 kHz (604), and 3 kHz (605). It can be seen that the system tolerates frequency errors of up to a few kHz with graceful degradation of performance.

Figure 7:
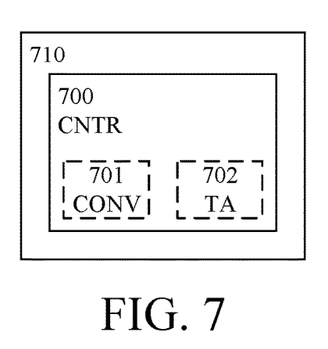
FIG. 7 is a schematic block diagram illustrating an example apparatus according to some embodiments.

FIG. 7 schematically illustrates an example apparatus 710 according to some embodiments. The apparatus 710 is for transferring data symbols between a transmitter and a receiver. For example, the apparatus 710 may be configured to execute one or more method steps as described in connection with any of FIGS. 1-5. Alternatively or additionally, the apparatus 710 may be comprisable (e.g., comprised) in one or more of: the transmitter, the receiver, and a communication device; e.g., a user device (such as a user equipment, UE, or a station, STA), a radio access node (such as a base station, BS, or an access point, AP), or a central processing node (such as a network server, or a cloud server).

The apparatus 710 comprises a controller (CNTR; e.g., controlling circuitry or a control module) 700.

The controller 700 is configured to cause conveyance of a signal indicative of communication symbols from the transmitter to the receiver (compare with steps 110, 210, 301 of FIGS. 1-3), wherein the communication symbols are specified by application of a transform to a representation of the data symbols.

To this end, the controller 700 may comprise, or be otherwise associated with (e.g., connected, or connectable, to) a signal conveyer (CONV; e.g., conveying circuitry or a conveyance module) 701. The conveyer may be configured to convey the signal.

The transform may be any of the transforms exemplified in connection with FIGS. 1-5. Thus, when expressed as a transform matrix, the transform has at least the first and second properties as described earlier.

The signal may be any of the signals exemplified in connection with FIGS. 1-5. Thus, in some embodiments, the signal indicative of the communication symbols is a constant envelope signal, which is angle modulated based on the transformed symbols.

In some embodiments, the controller 700 is also configured to cause application of the transform to the representation of the data symbols and/or application of a reverse operation of the transform to representations of the received signal (compare with sub-step 150 of FIG. 1, and steps 206, 316, 406, 516 of FIGS. 2-5).

To this end, the controller 700 may comprise, or be otherwise associated with (e.g., connected, or connectable, to) a transform applier (TA; e.g., transforming circuitry or a transform module) 702. The transform applier may be configured to apply the transform and/or the reverse operation thereof.

Although not explicitly shown in FIG. 7, it should be understood that the controller 700 may be further configured to cause performance of any other step(s) as explained in connection to FIGS. 1-5; and that—to this end—the controller 700 may comprise, or be otherwise associated with (e.g., connected, or connectable, to) functional unit(s) (e.g., functional circuitry or a functional module) configured to perform the other step(s).

Figure 8:
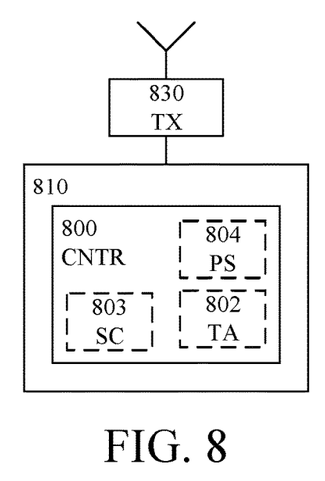
FIG. 8 is a schematic block diagram illustrating an example apparatus according to some embodiments.

FIG. 8 schematically illustrates an example apparatus 810 according to some embodiments. The apparatus 810 is for transferring data symbols between a transmitter and a receiver. For example, the apparatus 810 may be configured to execute one or more method steps as described in connection with any of FIGS. 1, 2, and 4. Alternatively or additionally, the apparatus 810 may be comprisable (e.g., comprised) in the transmitter and/or in a communication device; e.g., a user device (such as a user equipment, UE, or a station, STA), or a radio access node (such as a base station, BS, or an access point, AP). In some embodiments, the apparatus 810 may be seen as an exemplification of the apparatus 710 of FIG. 7.

The apparatus 810 comprises a controller (CNTR; e.g., controlling circuitry or a control module) 800.

The controller 800 is configured to cause transmission of a signal indicative of communication symbols (an exemplification of conveyance of the signal from the transmitter to the receiver; compare with steps 110, 210 of FIGS. 1 and 2), wherein the communication symbols are specified by application of a transform to a representation of the data symbols.

To this end, the controller 800 may comprise, or be otherwise associated with (e.g., connected, or connectable, to) a transmitter (TX; e.g., transmitting circuitry or a transmission module) 830. The transmitter may be configured to transmit the signal.

The transform may be any of the transforms exemplified in connection with FIGS. 1-5. Thus, when expressed as a transform matrix, the transform has at least the first and second properties as described earlier.

The signal may be any of the signals exemplified in connection with FIGS. 1-5. Thus, in some embodiments, the signal indicative of the communication symbols is a constant envelope signal, which is angle modulated based on the transformed symbols.

In some embodiments, the controller 800 is also configured to cause provision of the communication symbols by application of the transform to amplitude representations of the data symbols (compare with sub-step 150 of FIG. 1, and steps 206, 406 of FIGS. 2 and 4).

To this end, the controller 800 may comprise, or be otherwise associated with (e.g., connected, or connectable, to) a transform applier (TA; e.g., transforming circuitry or a transform module) 802. The transform applier may be configured to apply the transform. For example, the transform applier may be a precoder.

In some embodiments, the controller 800 is also configured to cause scaling of the amplitude representations before application of the transform, wherein the scaling for an amplitude representation is based on non-zero element values of a corresponding column of the transform matrix (compare with steps 204, 404 of FIGS. 2 and 4).

To this end, the controller 800 may comprise, or be otherwise associated with (e.g., connected, or connectable, to) a scaler (SC; e.g., scaling circuitry or a scaling module) 803. The scaler may be configured to scale the amplitude representations. For example, the scaler may be an equalizer.

In some embodiments, the controller 800 is also configured to cause phase shifting of the transformed symbols for provision of the communication symbols, wherein the phase shifting mitigates discontinuities between communication symbols (compare with steps 208, 408 of FIGS. 2 and 4).

To this end, the controller 800 may comprise, or be otherwise associated with (e.g., connected, or connectable, to) a phase shifter (PS; e.g., phase shifting circuitry or a phase shift module) 804. The phase shifter may be configured to shift the phase of the transformed symbols.

Although not explicitly shown in FIG. 8, it should be understood that the controller 800 may be further configured to cause performance of any other step(s) as explained in connection to FIGS. 2 and/or 4; and that—to this end—the controller 800 may comprise, or be otherwise associated with (e.g., connected, or connectable, to) functional unit(s) (e.g., functional circuitry or a functional module) configured to perform the other step(s). For example, this may apply to any one or more of the steps 202, 402, 403, 407, 409 of FIGS. 2 and 4.

Figure 9:
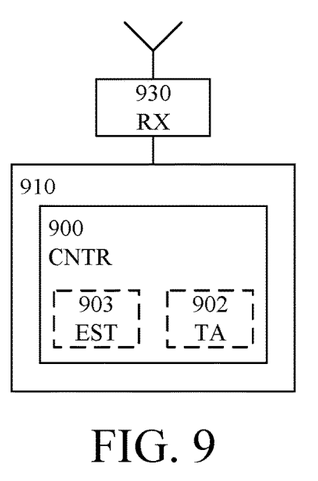
FIG. 9 is a schematic block diagram illustrating an example apparatus according to some embodiments.

FIG. 9 schematically illustrates an example apparatus 910 according to some embodiments. The apparatus 910 is for transferring data symbols between a transmitter and a receiver. For example, the apparatus 910 may be configured to execute one or more method steps as described in connection with any of FIGS. 1, 3, and 5. Alternatively or additionally, the apparatus 910 may be comprisable (e.g., comprised) in the receiver and/or in a communication device; e.g., a user device (such as a user equipment, UE, or a station, STA), or a radio access node (such as a base station, BS, or an access point, AP). In some embodiments, the apparatus 910 may be seen as an exemplification of the apparatus 710 of FIG. 7.

The apparatus 910 comprises a controller (CNTR; e.g., controlling circuitry or a control module) 900.

The controller 900 is configured to cause reception of a signal indicative of communication symbols (an exemplification of conveyance of the signal from the transmitter to the receiver; compare with steps 110, 310 of FIGS. 1 and 3), wherein the communication symbols are specified by application of a transform to a representation of the data symbols.

To this end, the controller 900 may comprise, or be otherwise associated with (e.g., connected, or connectable, to) a receiver (RX; e.g., receiving circuitry or a reception module) 930. The receiver may be configured to receive the signal.

The transform may be any of the transforms exemplified in connection with FIGS. 1-5. Thus, when expressed as a transform matrix, the transform has at least the first and second properties as described earlier.

The signal may be any of the signals exemplified in connection with FIGS. 1-5. Thus, in some embodiments, the signal indicative of the communication symbols is a constant envelope signal, which is angle modulated based on the transformed symbols.

In some embodiments, the controller 900 is also configured to cause application of a reverse operation the transform to representations of the received signal (compare with sub-step 150 of FIG. 1, and steps 316, 516 of FIGS. 3 and 5).

To this end, the controller 900 may comprise, or be otherwise associated with (e.g., connected, or connectable, to) a transform applier (TA; e.g., transforming circuitry or a transform module) 902. The transform applier may be configured to apply the reverse operation of the transform. For example, the transform applier may be a correlator.

The controller 900 is also configured to cause estimation of the data symbols based on the received signal (compare with steps 318, 518 of FIGS. 3 and 5).

To this end, the controller 900 may comprise, or be otherwise associated with (e.g., connected, or connectable, to) an estimator (EST; e.g., estimating circuitry or a estimation module) 903. The estimator may be configured to estimate the data symbols. For example, the estimator may be modulation symbol interpreter.

Although not explicitly shown in FIG. 9, it should be understood that the controller 900 may be further configured to cause performance of any other step(s) as explained in connection to FIGS. 3 and/or 5; and that—to this end—the controller 900 may comprise, or be otherwise associated with (e.g., connected, or connectable, to) functional unit(s) (e.g., functional circuitry or a functional module) configured to perform the other step(s). For example, this may apply to any one or more of the steps 312, 512, 513, 514, 517 of FIGS. 3 and 5.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as communication device (e.g., a wireless communication device or a network node).

Embodiments may appear within an electronic apparatus (such as a communication device) comprising arrangements, circuitry, and/or logic according to any of the embodiments described herein. Alternatively or additionally, an electronic apparatus (such as a communication device) may be configured to perform methods according to any of the embodiments described herein.

Figure 10:
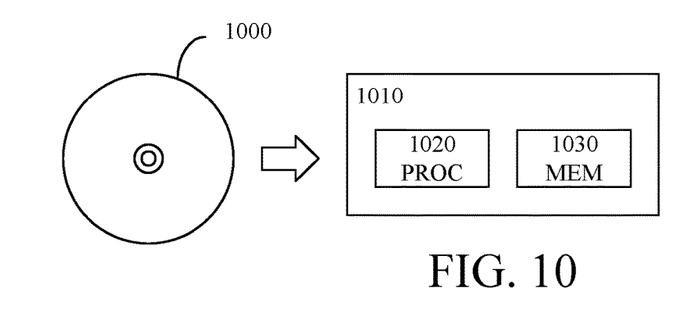
FIG. 10 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 10 illustrates an example computer readable medium in the form of a compact disc (CD) ROM 1000. The computer readable medium has stored thereon a computer program comprising program instructions. The computer program is loadable into a data processor (PROC; e.g., data processing circuitry or a data processing unit) 1020, which may, for example, be comprised in a communication device 1010. When loaded into the data processor, the computer program may be stored in a memory (MEM) 1030 associated with or comprised in the data processor. According to some embodiments, the computer program may, when loaded into and run by the data processor, cause execution of method steps according to, for example, any of the methods illustrated in FIGS. 1-5 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for transferring data symbols between a transmitter and a receiver, the method comprising:

specifying communication symbols through application of a transform to a representation of the data symbols, wherein the transform—when expressed as a transform matrix—has at least the following properties:

that a ratio—between number of zero-valued elements of the transform matrix and number of non-zero-valued elements of the transform matrix—equals or exceeds a sparsity threshold; and that a number of columns of the transform matrix that has a zero-valued element sum equals or exceeds an angle distortion mitigation threshold; and conveying a signal indicative of the communication symbols from the transmitter to the receiver, wherein the sparsity threshold has a value which is equal to $(2^N-(N+1))/2^N$ when the transform matrix has dimensionality $2^N \times 2^N$ wherein N is an integer larger than 2.

2. The method of claim 1, wherein the sparsity threshold has a value which is equal to, or larger than, 0.5.

3. The method of claim 1, wherein the angle distortion mitigation threshold has a value which is equal to $2^N-1$ when the transform matrix has dimensionality $2^N \times 2^N$ wherein N is an integer larger than 2.

4. The method of claim 1, wherein the transform—when expressed as the transform matrix—has the further property that a scalar product between a pair of columns does not exceed an orthogonality threshold for at least some pairs of columns.

5. The method of claim 4, wherein the orthogonality threshold has a value of zero.

6. The method of claim 1, wherein the transform—when expressed as the transform matrix—has the further property of full rank.

7. The method of claim 1, wherein the transform—when expressed as the transform matrix—has the further property that all non-zero elements have a same absolute value.

8. The method of claim 1, wherein the transform matrix $C_N$ is defined by $$C_N = \prod_{n=1}^{N} \begin{bmatrix} H_2 \otimes I_{2^{N-n}} & 0_{2^{N-n+1} \times (2^N - 2^{N-n+1})} \\ 0_{(2^N - 2^{N-n+1}) \times 2^{N-n+1}} & I_{(2^N - 2^{N-n+1})} \end{bmatrix}$$

or any row- and/or column-wise permutation thereof, wherein N is an integer larger than 2, $$H_2 = \begin{bmatrix} 1 & 1 \\ 1 & -1 \end{bmatrix},$$

$I_M$ denotes an identity matrix with dimensions M×M, $0_{K \times L}$ denotes a matrix of dimensions K×L with all entries equal to zero, $\Pi[\cdot]$ denotes matrix multiplication, and $\otimes$ denotes a Kronecker product.

9. The method of claim 1, wherein the transform matrix $C_N$ is recursively defined by $$C_0 = [1], \quad C_n = \begin{bmatrix} C_{n-1} & I_{2^{n-1}} \\ C_{n-1} & -I_{2^{n-1}} \end{bmatrix}, \quad 1 \leq n \leq N$$

or any row- and/or column-wise permutation thereof, wherein N is an integer larger than 2, and $I_M$ denotes an identity matrix with dimensions M×M.

10. The method of claim 1, wherein the signal indicative of the communication symbols is a constant envelope signal, and wherein the constant envelope signal is angle modulated based on the transformed symbols.

11. The method of claim 1 performed by the transmitter, wherein the method further comprises providing the communication symbols by applying the transform to amplitude representations of the data symbols, and wherein conveying the signal indicative of the communication symbols comprises transmitting the signal.

12. The method of claim 11, further comprising scaling the amplitude representations before applying the transform, wherein the scaling for an amplitude representation is based on non-zero element values of a corresponding column of the transform matrix.

13. The method of claim 11, further comprising phase shifting the transformed symbols to provide the communication symbols, wherein the phase shifting mitigates discontinuities between communication symbols.

14. The method of claim 1 performed by the receiver, wherein conveying the signal indicative of the communication symbols comprises receiving the signal, and wherein the method further comprises estimating the data symbols by applying a reverse operation of the transform to angle representations of the received signal.

15. A non-transitory computer readable medium, having thereon a computer program comprising program instructions, the computer program being loadable into a data processing unit and configured to cause execution of a method when the computer program is run by the data processing unit, wherein the method is for transferring data symbols between a transmitter and a receiver, and wherein the method comprises:
specifying communication symbols through application of a transform to a representation of the data symbols, wherein the transform—when expressed as a transform matrix—has at least the following properties:
that a ratio—between number of zero-valued elements of the transform matrix and number of non-zero-valued elements of the transform matrix—equals or exceeds a sparsity threshold; and
that a number of columns of the transform matrix that has a zero-valued element sum equals or exceeds an angle distortion mitigation threshold; and
conveying a signal indicative of the communication symbols from the transmitter to the receiver,
wherein the sparsity threshold has a value which is equal to $(2^N - (N+1))/2^N$ when the transform matrix has dimensionality $2^N \times 2^N$ wherein N is an integer larger than 2.

16. An apparatus for transferring data symbols between a transmitter and a receiver, the apparatus comprising controlling circuitry configured to cause conveyance of a signal indicative of communication symbols from the transmitter to the receiver, wherein the communication symbols are specified by application of a transform to a representation of the data symbols, wherein the transform—when expressed as a transform matrix—has at least the following properties:
that a ratio—between number of zero-valued elements of the transform matrix and number of non-zero-valued elements of the transform matrix—equals or exceeds a sparsity threshold; and
that a number of columns of the transform matrix that has a zero-valued element sum equals or exceeds an angle distortion mitigation threshold,
wherein the sparsity threshold has a value which is equal to $(2^N - (N+1))/2^N$ when the transform matrix has dimensionality $2^N \times 2^N$ wherein N is an integer larger than 2.

17. The apparatus of claim 16, wherein the sparsity threshold has a value which is equal to, or larger than, 0.5.

18. The apparatus of claim 16, wherein the angle distortion mitigation threshold has a value which is equal to $2^N - 1$ when the transform matrix has dimensionality $2^N \times 2^N$ wherein N is an integer larger than 2.

19. The apparatus of claim 16, wherein the transform—when expressed as the transform matrix—has the further property that a scalar product between a pair of columns does not exceed an orthogonality threshold for at least some pairs of columns.

20. The apparatus of claim 19, wherein the orthogonality threshold has a value of zero.

21. The apparatus of claim 16, wherein the transform—when expressed as the transform matrix—has the further property of full rank.

22. The apparatus of claim 16, wherein the transform—when expressed as the transform matrix—has the further property that all non-zero elements have a same absolute value.

23. The apparatus of claim 16, wherein the transform matrix $C_N$ is defined by $$C_N = \prod_{n=1}^{N} \begin{bmatrix} H_2 \otimes I_{2^{N-n}} & 0_{2^{N-n+1} \times (2^N - 2^{N-n+1})} \\ 0_{(2^N - 2^{N-n+1}) \times 2^{N-n+1}} & I_{(2^N - 2^{N-n+1})} \end{bmatrix}$$

or any row- and/or column-wise permutation thereof, wherein N is an integer larger than 2, $$H_2 = \begin{bmatrix} 1 & 1 \\ 1 & -1 \end{bmatrix},$$

$I_M$ denotes an identity matrix with dimensions M×M, $0_{K \times L}$ denotes a matrix of dimensions K×L with all entries equal to zero, Π[·] denotes matrix multiplication, and ⊗ denotes a Kronecker product.

24. The apparatus of claim 16, wherein the transform matrix $C_N$ is recursively defined by $$C_0 = [1], \quad C_n = \begin{bmatrix} C_{n-1} & I_{2^{n-1}} \\ C_{n-1} & -I_{2^{n-1}} \end{bmatrix}, \quad 1 \leq n \leq N$$

or any row- and/or column-wise permutation thereof, wherein N is an integer larger than 2, and $I_M$ denotes an identity matrix with dimensions M×M.

25. The apparatus of claim 16, wherein the signal indicative of the communication symbols is a constant envelope signal, and wherein the constant envelope signal is angle modulated based on the transformed symbols.

26. The apparatus of claim 16, wherein the apparatus is configured to be comprised in the transmitter, wherein the controlling circuitry is further configured to cause provision of the communication symbols by application of the transform to amplitude representations of the data symbols, and wherein conveyance of the signal indicative of the communication symbols comprises transmission of the signal.

27. The apparatus of claim 26, wherein the controlling circuitry is further configured to cause scaling of the amplitude representations before application of the transform, wherein the scaling for an amplitude representation is based on non-zero element values of a corresponding column of the transform matrix.

28. The apparatus of claim 26, wherein the controlling circuitry is further configured to cause phase shifting of the transformed symbols for provision of the communication symbols, wherein the phase shifting mitigates discontinuities between communication symbols.

29. The apparatus of claim 16, wherein the apparatus is configured to be comprised in the receiver, wherein conveyance of the signal indicative of the communication symbols comprises reception of the signal, and wherein the controlling circuitry is further configured to cause estimation of the data symbols by application of a reverse operation of the transform to angle representations of the received signal.

30. A transmitter comprising the apparatus of claim 16 and transmission circuitry configured to transmit the signal, wherein the controlling circuitry is configured to cause provision of the communication symbols by application of the transform to amplitude representations of the data symbols.

31. A receiver comprising the apparatus of claim 16 and reception circuitry configured to receive the signal, wherein the controlling circuitry is configured to cause estimation of the data symbols by application of a reverse operation of the transform to angle representations of the received signal.

32. A communication device comprising the apparatus of claim 16.

* * * * *